United States Patent

[11] 3,545,557

| [72] | Inventor | Cornelius J. Dykstra |
| | | 2410 30th St., Des Moines, Iowa 50310 |
| [21] | Appl. No. | 781,900 |
| [22] | Filed | Dec. 6, 1968 |
| [45] | Patented | Dec. 8, 1970 |

[54] PERCENTAGE SCALE AND METHOD OF WEIGHING TO INDICATE DIRECTLY PERCENTAGE PROPORTIONS OF WEIGHED MATERIAL
4 Claims, 5 Drawing Figs.

[52] U.S. Cl. .................................................... 177/200, 177/251
[51] Int. Cl. ......................................................... G01g 19/00
[50] Field of Search ............................................ 177/43, 44, 199, 200, 246, 248, 251

[56] References Cited
UNITED STATES PATENTS

| 227,050 | 3/1880 | Palmer ........................ | 177/200 |
| 1,110,262 | 9/1914 | Hopkinson .................... | 177/200X |
| 1,136,694 | 4/1915 | Michalis et al. ............... | 177/43 |
| 1,429,907 | 9/1922 | Krick ............................ | 177/199X |
| 1,643,343 | 9/1927 | Manns .......................... | 177/44 |
| 2,636,724 | 4/1953 | Eacrett ......................... | 177/200 |
| 2,687,037 | 8/1954 | Saxe ............................ | 177/199X |

*Primary Examiner*—Richard B. Wilkinson
*Assistant Examiner*—George H. Miller, Jr.
*Attorney*—Rudolph L. Lowell

ABSTRACT: The determination of a relative or proportional weight of a material being weighed is usually accomplished by first weighing 100 percent of the material, then weighing a part of such total material weight, and with such two weights known then mathematically determining the percentage which such part of the weight bears to the total weight. The present invention comprises a beam scale that is graduated to indicate directly thereon the percentage by weight which one portion of the material being weighed bears to the total weight of the material being weighed.

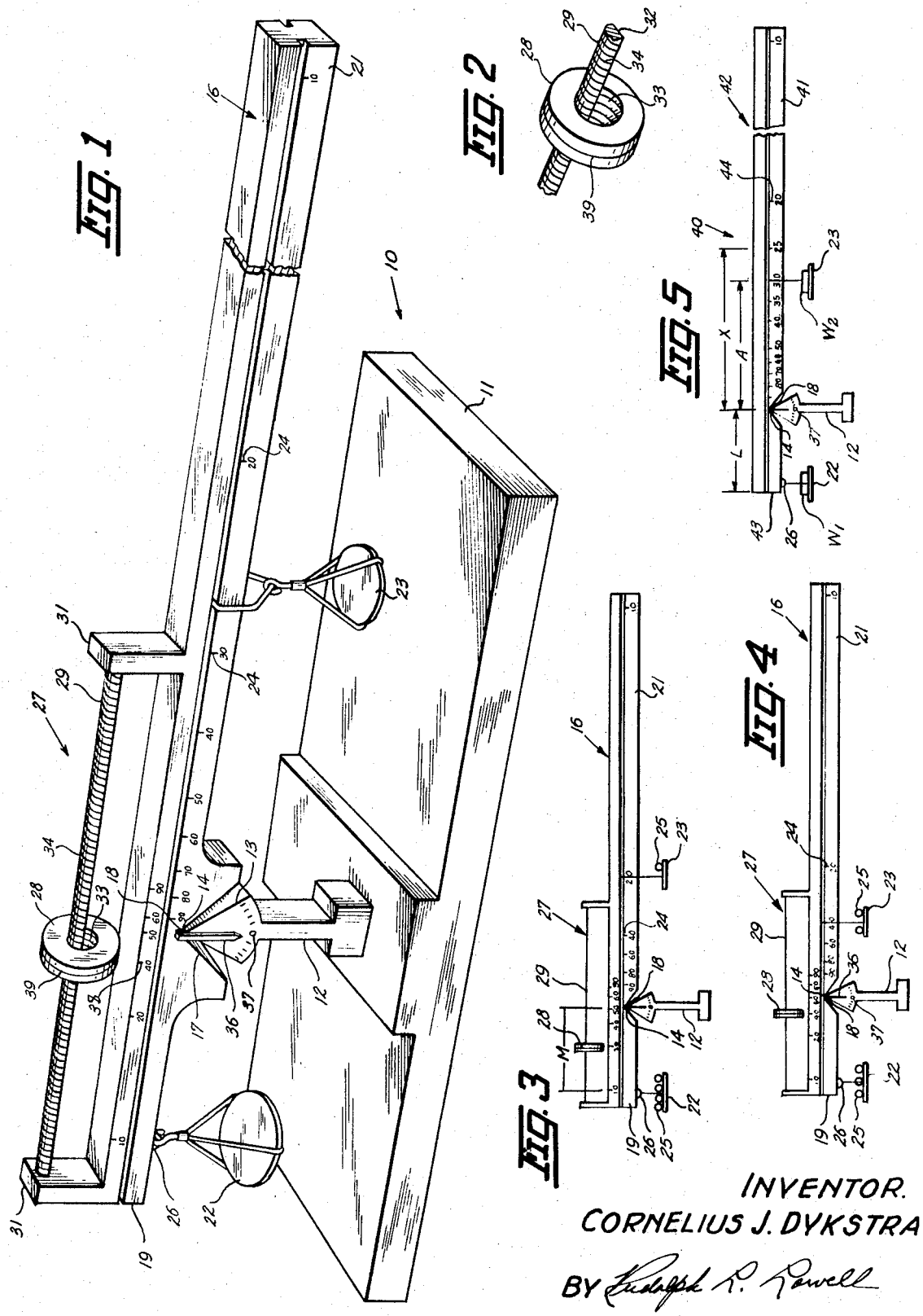
INVENTOR.
CORNELIUS J. DYKSTRA
BY Rudolph P. Powell
ATTORNEY.

PERCENTAGE SCALE AND METHOD OF WEIGHING TO INDICATE DIRECTLY PERCENTAGE PROPORTIONS OF WEIGHED MATERIAL

SUMMARY OF THE INVENTION

The invention provides a percentage scale of a simple construction that is efficient in operation to indicate directly, and within close tolerances, the percentage by weight which one portion of the material being weighed bears to the total weight of the material being weighed. The graduations on the scale are precalibrated so as to completely eliminate the need of mathematical computations after a weighing operation. Any error in computation and time required for such computation is thus avoided.

DETAIL DESCRIPTION OF THE INVENTION

Referring to the drawing:

FIG. 1 is a perspective view of the scale of this invention;

FIG. 2 is a detail perspective view of a counterpoise or balance that forms part of the scale;

FIGS. 3 and 4 are diagrammatic showings of the scale illustrating graphically the calibration of the scale beam for indicating directly percentage proportions weighed thereby; and FIG. 5 shows a modified form of the invention.

As shown in FIG. 1 of the drawings the percentage scale of this invention, indicated generally as 10, includes a base member 11 on which is mounted an upright fulcrum support 12 having an upwardly pointed upper section 13 that terminates in a bearing surface 14. A weighing beam 16 is formed intermediate its ends with an inverted V-shape notch 17 for engaging at the apex 18 thereof the bearing surface 14. The notch 17 is located so as to provide beam sections 19 and 21 of unequal lengths to opposite sides thereof, with the apex 18 defining the junction of the sections 19 and 21.

Attached to the shorter beam section 19 at a fixed location thereon is a tray or material-supporting means 22. A second tray means 23 is adjustably supported for movement longitudinally of the longer beam section 21 which is provided with longitudinally spaced graduations 24 to indicate a moved position of the tray means 23.

The graduations 24 are precalibrated relative to a fixed or known moment arm, indicated at M (FIG. 3) for the tray means 22 and which arm M extends from the notch apex 18 to the point of attachment of the tray means 22 indicated at 26. This precalibration is determined on the basis of dividing 100 percent of the material being weighed with a first part carried at the attachment point 26 and a second part movable along the longer beam section 21. By relatively varying the weights of the divided material parts, the moment arms on the longer beam section 21 required to balance the beam for such weight variations are readily determined. 116 Thus assuming a 100 percent total material weight of 5 ounces and a fixed moment arm M of 1 inch, and with the total weight divided so that 4 ounces are applied at the attachment point 26 on the short section 19, the moment arm required on the long beam section 21 with the remaining 1 ounce weight, in order to balance the beam 16, would be 4 inches. This moment arm of 4 inches is arrived at by using the formula of 4 ounces times 1 inch being equal to 1 ounce times X inches and then solving for X.

This solution is graphically shown in FIG. 3 wherein a total weight of 5 ounces is illustrated by five ball bearings 25 with four of them carried at the attachment point 26 and the remaining ball bearing 25 on the long beam section 21 on a moment arm of 4 inches relative to the fulcrum support. Since the one ball bearing represents one-fifth or 20 percent of the o total weight of the five ball bearings the moment arm of 4 inches is indicated by a graduation 24 marked as 20 percent.

With the 5 ounce total weight divided as shown in FIG. 4 wherein 3 ounces are carried at the attachment point 26 and 2 ounces on the long beam section 21, the beam 16 is in balance with a moment arm for the 2 ounce weight of 1½ inches Since the 2 ounce weight is 40 percent of the total weight of 5 ounces the length of the 1½ inch moment arm is indicated by a graduation 24 marked as 40 percent.

In this manner the long beam section 21 is marked over the length thereof to indicate directly the percentage proportion which that part of the weight carried thereon bears to the total weight supported from both of the beam sections 19 and 21, when the beam 16 is in balance. It will be noted that in this percentage calibration of the long beam section 21 the weight of the tray means 22 and 23 was not considered. This weight of the tray means would, of course, affect the accuracy of the percentage indications. In other words longitudinal adjustment of the tray means 23 along the long beam section 21 will vary the effective moment of the weight carried thereby at a given percentage graduation 24 to an extent corresponding to the additional weight of the tray means 23.

To compensate for the weight of the tray means 22 and 23, to maintain the accuracy of the predetermined percentage graduations 24, there is provided a counterpoise or balancing unit 27 that has a weight or counterbalance 28 adjustable longitudinally of the beam 16 on a member 29 which extends between and is supported on upright projections 31 spaced longitudinally of the beam 16 at equal distances to opposite sides of the apex or fulcrum point 18. The counterbalance 28 is in the form of a cylindrically shaped nut and member 29 comprises a screw member that has a flat lower side 32. The bore of the nut 28 is of a greater diameter than the diameter of the screw member 29 and is formed with threads 33 that have the same pitch as the threads 34 on the top side of the screw member 29. Thus by lifting the counterbalance 28, to disengage the threads 33 and 34, the counterbalance is adjustable longitudinally of the screw member and is then maintained in an adjusted position by the engagement of the threads 33 and 34 when the counterbalance is in a supported position on the screw member 29.

With the tray means 22 fixed at its attachment point 26 the tray means 23 is moved, for example to the graduation 24 marked as 40 percent. The counterbalance 28 is then adjusted longitudinally of the screw member 29 until the beam 16 is in balance. This balanced condition of the beam is indicated when a balance pointer 36 carried on the beam 16 at the fulcrum point or apex 18 is at a zero or center marking 37 provided on the fulcrum support 12 at a position in vertical alignment with a center marking 39 that extends circumferentially about the counterbalance 28.

The above procedure is duplicated for the location of the tray means 23 at each of the marked percentage positions 24 on the long beam section 21 so that the beam 16 is graduated with corresponding percentage positions 38 for the counterbalance 28. The beam 16 with the tray means 22 and 23 carried thereby is thus maintained in balance by adjusting the counterbalance 28 to a percentage position therefor corresponding to a like percentage position of the tray means 23.

In the use the total material being weighed is divided between the tray means 22 and 23. The tray means 23 and counterbalance 28 are then relatively adjusted until the beam 16 is in balance, as indicated by the pointer 36, when the tray means 23 and the counterbalance 28 are at a corresponding percentage positions therefor. The percentage reading thus attained indicates directly and accurately the percentage proportion which the material weight carried on the tray means 23 bears to the total weight of the material that is carried on both of the tray means 22 and 23.

The modified form of the scale 40 shown in FIG. 5 is similar to the scale 10 of FIG. 1 except that the long section 41 of the beam 42 is precalibrated to compensate for the weight of the tray means 22 and 23 so as to eliminate the counterbalance 27.

This modified form is particularly applicable for use in determining the percentage proportion for wholesale marketing purposes of whole nuts and like products the value of which is predicated on the weight of the meats or useful portion of the product relative to the overall weight of the nuts. In this percentage determination a sample batch of a fixed number of nuts are generally weighed. The overall weight of each sample batch is thus substantially the same.

In precalibrating the beam 42 it is desirable that a balance point of a certain fixed percentage be initially used that corresponds to an average percentage within a range of acceptable percentage proportions for a particular product. Thus in the case of walnuts for example let it be assumed that the percentage range which the nut meats bear to the overall weight of the nuts falls within a 25 percent to 35 percent range for an overall weight of about 8 ounces for a sample batch of nuts.

With 30 percent being the average percentage in the range of readings from 25 percent to 35 percent an initial calibration is made to determine the moment arm A of the movable tray 23 required to balance the beam 42, with 8 ounces of the material wherein 30 percent or 2.4 ounces is carried on the movable tray means 23, 70 percent or 5.6 ounces is carried on the stationary tray 22 with a known arm length L such as for example 2.5 inches from the fulcrum support 12. Thus from the equation:

(1) $$(2.5 \times 5.6) = 2.4 \times A$$

the arm A for the movable tray 23 for a percentage proportion of 30 percent of an overall weight of material of 8 ounces if found to be 5.833 inches. This arm length A will hereinafter be referred to as the "fixed balance point". Since the tray 22 is stationary, its moment does not require consideration in further calculations. However, since the tray means 23 is movable its moment will vary relative to its moment at the fixed balance point of 30 percent. Assuming a weight of the tray means 23 of .2 ounces the moment thereof at the fixed balance point will be:

(2) $$5.833 \times .2 \text{ or } 1.167 \text{ inch ounces}$$

On movement of the movable tray means 23 to a 25 percent reading on the beam 42, the moment thereof will vary relative to its moment of 1.167 inch ounces at the fixed balance point of 30 percent. The 25 percent weight of the material on the movable tray means 23, therefore, must be varied a like amount to maintain the accuracy of the 25 percent reading. This is accomplished by using the formula:

(3) $$X = \frac{(W_1 \times L) + (T \times A)}{W_2 + T}$$

wherein X is the length of the moment arm of the movable tray 23 at the 25 percent reading; $W_1$ is the weight of the material carried on the fixed tray 22; L is the known moment arm of the fixed tray 22; T is the known weight of the movable tray 23, A is the moment arm of the movable tray 23 at the fixed balance point of the 30 percent reading; and $W_2$ is the known weight of the material on the movable tray 23.

Solving for the moment arm X of the movable tray 23 for a 25 percent reading on the beam 42 and with the known weight of the movable tray 23 being .2 ounces:

(4) $$X = \frac{(.75 \times 8)2.5 + (.2 \times 5.833)}{(.25 \times 8) + .2} = 7.348 \text{ inches}$$

The accuracy of the calibrated 25 percent reading at 7.348 inches is checked as follows. The moment arm M for a 25 percent reading on the beam 42, without considering the moment arm effected by the weight the movable tray 23 is derived from the equation:

(5) $$M = \frac{(.75 \times 8)2.5}{(.25 \times 8)} = 7.5 \text{ inches}$$

The moment added by the movable tray 23 on the beam 40 relative to its moment at the fixed balance point for the 30 percent reading is:

(6) $$(7.348 - 5.833) \times .2 = .303 \text{ inch ounce}$$

The moment of the 25 percent material weight on the movable tray 22 which is averaged or canceled out by the moment of the tray 23 at the 25 percent reading is:

(7) $$(7.5 - 7.348) \times 2 = .304 \text{ inch ounce}$$

By following the above equation for (3) for a 25 percent reading on the beam 42, X is found to be 4.722 inches, which calibration checked out in accordance with equations (5) (6) and (7) results, respectively, in M being equal to 4.643 inches; with a moment variation of the movable tray 23 of (5.833 −4.722) × .2 or .222 inch ounces and a counter or equal moment of the material on tray 23 of (4.722 −2.643) × 2.8 or .221 inch ounces.

By limiting the calibrations to a range of percentage readings for a particular product the length of the beam 42 is appreciably reduced. However, the beam 42 may be calibrated over a full percentage range if desired by the use of the above equations.

Thus, for a 10 percent reading the moment arm of the movable tray 23 is 19.167 inches and for a 90 percent reading .428 inches. The calibration of the percentage readings is accurate over the full percentage range for a given 100 percent of material, and this accuracy will be maintained within practical tolerances for 100 percent weight variations of about 25 percent to either side of the given weight. Thus, in the above example for an overall weight of a sample material of 8 ounces, such weight could be varied from 6 ounces to 10 ounces but with the greatest accuracy taking place at the 8 ounce material weight for which the beam 42 was calibrated.

I claim:

1. A percentage scale comprising:
    a. a scale beam;
    b. a fulcrum means for supporting the scale beam intermediate the ends thereof so that the beam has a short section to one side of the fulcrum means and a long section to the opposite side thereof, said fulcrum means defining the junction of the adjacent ends of said two sections;
    c. a first material-supporting means attachable to said short section at a position defining a predetermined moment arm length relative to said fulcrum means;
    d. a second material-supporting means carried on said long section for adjustable movement longitudinally thereof; and
    e. longitudinally spaced graduations provided on said beam to indicate moment arm lengths thereon, relative to the length of said predetermined moment arm, required to balance the beam for a weight distribution of 100 percent of the material weight to opposite sides of the fulcrum means for variable portions of said material weight acting on said predetermined moment arm, whereby the graduations indicate directly the percentage by weight which the weight of material on the second-supporting means bears to the total weight of material carried on both of said supporting means.

2. The percentage scale according to claim 1 wherein:
    a. said graduations include first longitudinally spaced graduations on said long section to indicate moment arm lengths thereon, relative to the length of said predetermined moment arm, required to balance the beam for a weight distribution of 100 percent of the material to opposite sides of the fulcrum means for variable portions of said weight acting on said predetermined moment arm;
    b. an adjustable balancing means on said beam for balancing said beam for each moved position of the second-supporting means to a graduated position on said long section;
    c. second longitudinally spaced graduations on said beam for indicating a moved position of the balancing means corresponding to a graduated moved position of the second-supporting means on said long section; and
    d. said adjustable balancing means and adjustable supporting means, when 100 percent of the material being weighed is carried on the two supporting means, being relatively adjusted to corresponding graduated positions therefor to balance the beam, whereby the graduations on the long section will indicate directly the percentage by weight which the weight of material on the second-supporting means bears to the total weight of material carried on both of said supporting means.

3. The percentage scale according to claim 1 wherein: said graduations are spaced longitudinally only on said long section to indicate moment arm lengths thereon, relative to the length of said predetermined moment arm, required to balance the beam for the weight of said supporting means and for a weight distribution of 100 percent of the material weight carried in variable portions on said supporting means, whereby said graduations on the long section indicate directly the percentage by weight which the weight of material on the second-supporting means bears to the total weight of material carried on both of said supporting means.

4. The method of indicating directly on a scale beam the percentage by weight that one portion of a material being weighed bears to the total amount of material being weighed comprising:
   a. indicating a fulcrum point on the beam so as to have beam sections of unequal lengths to opposite sides of the fulcrum point;
   b. locating an attachment position for a first material support on the shorter beam section to define a predetermined moment arm relative to the fulcrum point;
   c. adjustably mounting a second material support for movement longitudinally of the longer beam section;
   d. providing percentage graduations on said beam at longitudinally spaced positions to indicate moment arm lengths thereon, relative to the predetermined moment arm on the shorter beam section, required to balance the beam at the fulcrum point thereon for said material supports and for variable quantities of material positioned to opposite sides of the fulcrum point totaling 100 percent of the material being weighed;
   e. moving said second material support to corresponding graduations therefor to balance the beam, whereby the graduations at the moved position of the second material support will indicate directly the percentage which the weight of material carried on the second material support bears to the total weight of material being weighed.